United States Patent

[11] 3,609,296

| [72] | Inventor | Joe B. Blair |
| | | Artesia, Calif. |
| [21] | Appl. No. | 23,276 |
| [22] | Filed | Mar. 27, 1970 |
| [45] | Patented | Sept. 28, 1971 |
| [73] | Assignee | Fuel Engineering |
| | | Torrance, Calif. |

[54] ELECTRICALLY HEATED AUTOCLAVE APPARATUS
4 Claims, 1 Drawing Fig.

[52] U.S. Cl. ............................................. 219/400,
165/4, 165/107, 219/439, 219/440
[51] Int. Cl. ..................................................... F27d 11/02
[50] Field of Search .......................................... 219/400
(1), 430 (1), 440 (39), 399; 165/2, 4, 107;
126/116, 21 A; 263/15; 62/62

[56] References Cited
UNITED STATES PATENTS

| 2,475,077 | 7/1949 | Clancy ........................ | 62/62 |
| 3,452,810 | 7/1969 | Schmidt et al. ............... | 165/2 |
| 3,501,620 | 3/1970 | Sauer ........................... | 219/400 |
| 3,521,032 | 7/1970 | Heuss .......................... | 219/400 |

Primary Examiner—Volodymyr Y. Mayewsky
Attorney—Fulwider, Patton, Rieber, Lee & Utecht ABSTRACT: An autoclave apparatus comprising an autoclave forming a product-receiving chamber having an inlet port in one end and an outlet port in the opposite end and being, further, formed with an access opening. An electrically heated heat exchanger is formed with a chamber which contains heat storage means and such chamber has an inlet in one end and an outlet in the opposite end. Conduits connect the inlet to the autoclave with the outlet from the heat exchanger and the outlet of the autoclave with the inlet to the heat exchanger. Means is provided for supplying gas to the system whereby such system may be pressurized with the gas and such gas circulated through the autoclave and in heat-exchange relationship with the heat storage means to heat such gas to an elevated temperature thereby providing an atmosphere in the product-receiving chamber of the desired temperature and pressure.

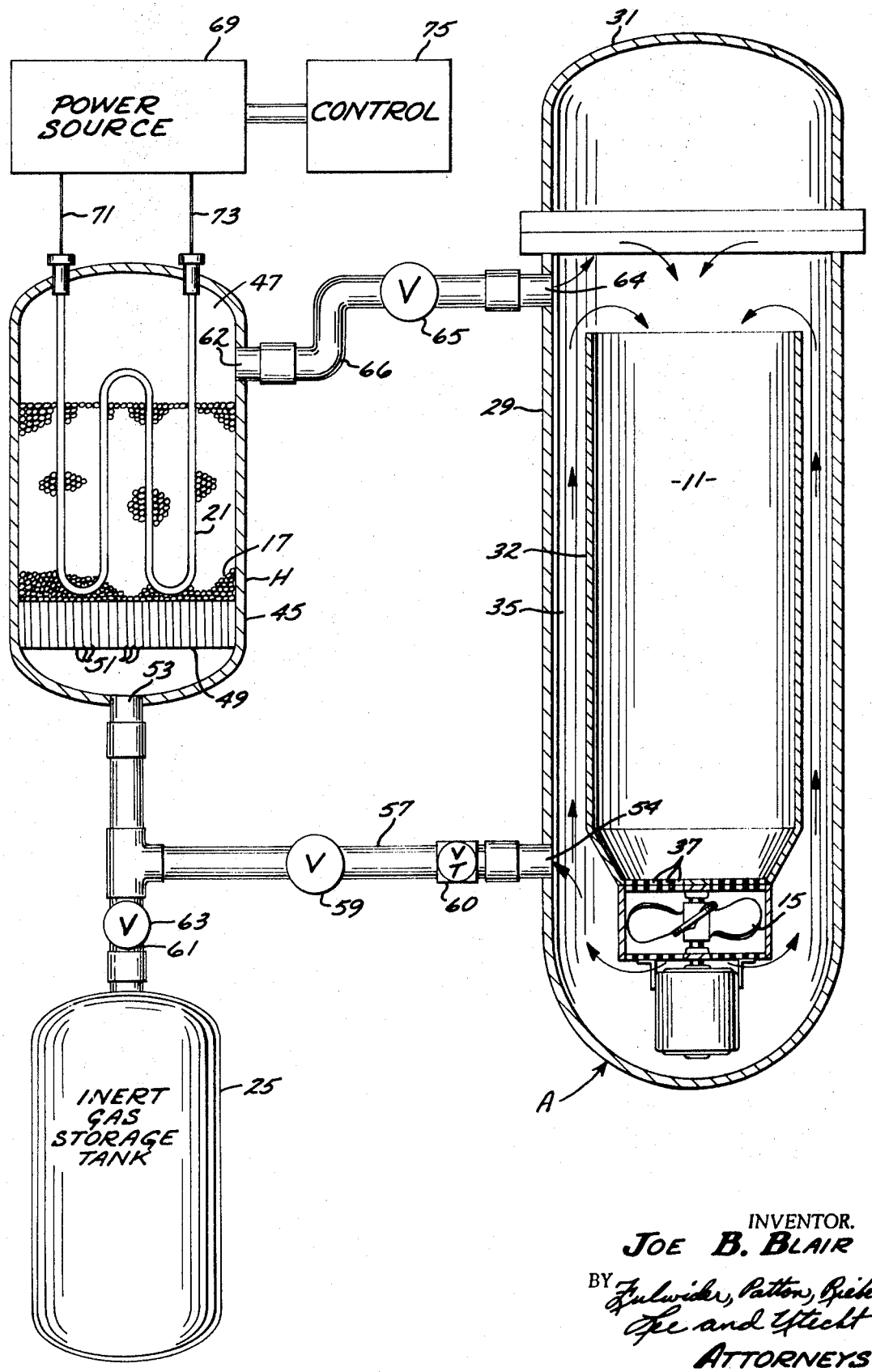

3,609,296

ELECTRICALLY HEATED AUTOCLAVE APPARATUS

BACKGROUND OF THE INVENTION

1. Field of the Invention

The present invention relates to an autoclave apparatus for providing an atmosphere at an elevated temperature for curing products during bonding and the like.

2. Description of the Prior Art

Many presently known autoclave systems include heaters, or heat exchangers, disposed in the autoclave itself for direct heating of gas circulated thereover. Such autoclave systems suffer the shortcoming of requiring a relatively high power input to the heater during the heating phase of the autoclave operating cycle to avoid an excessively long heating stage. Other autoclave systems include heat storage means external to the autoclave and heated by burners which also produce inert gases. An autoclave system of this type is shown in U.S. Pat. No. 3,452,810. Autoclave systems of this type have the disadvantage of requiring relatively expensive piping and controls for heating the heat storage means. Also, the burners must be turned off during pressurization of the autoclave thereby discontinuing the heat input to the heat storage means and reducing the amount of heat that would otherwise be available for heating the gas during the heating portion of the operating cycle.

SUMMARY OF THE INVENTION

The autoclave of present invention is characterized by an autoclave defining a product-receiving chamber and having an inlet port connected with the outlet port of a heat exchanger and an outlet port connected with the inlet port of the heat exchanger. The heat exchanger is formed with a chamber that has heat storage means therein and an electrical heater is disposed in heat exchange relationship with the heat storage means to store heat therein. A gas supply is connected with the heat storage means for introducing gas thereinto, and a blower is circulating the gas through the autoclave and heat exchanger to heat such gas to an elevated temperature.

DESCRIPTION OF THE PREFERRED EMBODIMENT

The autoclave system of present invention includes an autoclave A formed with a product-receiving chamber 11 which has gas circulated therethrough by means of a blower 15 for circulation through a heat exchanger H. Disposed in the heat exhanger H is a quantity of pebbles 17 of metal refractory which are loosely packed for ready passage of gas therethrough. An electric heating element 21 is disposed directly in the pebbles 17 whereby such heater may be actuated to heat the pebbles 17 and such heating continued during pressurization of the system for a gas tank 25 connected with the exchanger H. After pressurization of the system, the blower 15 may continue circulation of the gas through the heat exchange H and autoclave A until such gas is heated to the desired temperature. The autoclave A is formed by a cylindrical shell 29 which has an access opening in the upper end thereof that is covered by a door 31. A cylindrical liner 32 extends coaxially with the shell 29 and forms the product-receiving chamber 11 and cooperates with the shell 29 to form an annular passage 35 for gas flow. The blower 15 is carried in a chamber supported in the lower end of the liner 32 and the top and bottom walls of such chamber are formed with a plurality of apertures 37 through which gas may be drawn.

The heat exchanger H includes an outer shell 45 formed with an inner chamber 47 having a platform 49 supported in the bottom extremity thereof and formed with a plurality of vertical gas passages 51. The heat exchanger shell 45 is formed on its bottom end with an inlet port 53 which is connected with the outlet port 54 of the autoclave A by means of a conduit 57 having a flow control valve 59 and vent valve 60 therein. The conduit 57 has the gas supply tank 25 connected therewith by means of a conduit 61 including a shutoff valve 63. The upper extremity of the heat exchanger shell 45 is formed with an outlet 62 that is connected with the inlet 64 of the autoclave A by means of a conduit 66 having a flow control valve 65 therein. The heating element 21 is connected with a power source 69 by means of leads 71 and 73 and the output of such power source is controlled by an electrical control unit 75.

In operation the control 75 may be turned on in advance of the time at which the product to be treated is placed within the autoclave A to thereby gradually heat the refractory pebbles 17 to a relatively high temperature. It is of importance that a relatively small power input may be utilized to store a relatively large quantity of heat in the heat storage pebbles 17 for subsequent rapid heating of gas circulated therethrough. When it is desirable to treat a product, the door 31 may be opened and the product placed within the product-receiving chamber 11 and the door 31 closed.

Thereafter, the shutoff valve 63 may be opened to introduce gas to the heat exchanger H to pressurize the entire system to the desired pressure. Then the blower 15 may be actuated to draw gas downwardly through the product-receiving chamber 11 and force it outwardly and upwardly through the annular passage 32. A portion of the gas forced upwardly through the annular passage 32 passes out the outlet port 54 and through the conduit 57 for recirculation through the heat exchanger H. The gas passed upwardly through the heat exchanger H will pass through the loosely arranged pebbles 17 to thereby affect relatively rapid heating of the gas which then exits the outlet port 62 and passes through the conduit 64 to be reintroduced to the autoclave A through the inlet port 64. The hot gas introduced to the autoclave A is mixed with the cooler gas passed upwardly in the annular passage 32 to cool such incoming gas and prevent direct impingement of the hot gases upon the product in the chamber 11. The described circulation of the gas through the autoclave and the heat exchanger H is continued until such gas reaches the desired elevated temperature for treatment of the product and the product may be maintained at the desired elevated temperature for a select period of time by adjusting the flow control valves 59 and 65 to maintain the necessary circulation of gas and/or by adjusting the controls 75 to control the current to the heating element 21.

When treatment of the product in the chamber 11 has been completed, the circulation blower 15 may be deenergized to enable the gas in the autoclave A to cool and return to ambient temperature. Thereafter the pressure in the autoclave A may be reduced by opening the vent valve 60. The door 31 may then be opened and the treated product removed from the chamber 11. Additional products to be treated may then be placed in the chamber 11, the door 31 closed, and the system again pressurized by opening the valve 63 to admit the charge gas. It will be noted that during the entire described cycle of cooling the gas previously exhausted from the autoclave A, exhausting thereof, and pressurization of the system, the electric heater 21 may remain energized to continue the gradual heat input to the pebbles 17 to store heat for subsequent heating of the gas. Again, the blower 15 may be started to circulate the charge gas through the autoclave A and heat exchanger H to absorb the heat stored in the pebbles 17 and heat such gas to the desired temperature.

From the foregoing detailed description it will be apparent that the autoclave system of present invention provides a convenient and straight forward means for rapidly heating an autoclave to an elevated temperature with a relatively low power input to the heating element. Further, this relatively rapid heating of the autoclave atmosphere is accomplished with relatively inexpensive equipment and controls thereby reducing the cost of initial installation.

Various modifications and changes may be made with regard to the foregoing detailed description without departing from the spirit of invention.

I claim:

1. An autoclave system, comprising:

an autoclave formed with a product-receiving chamber having a inlet port, outlet port, and including an access opening:
a heat exchanger formed with a chamber having an inlet and an outlet;
heat storage means disposed in said chamber formed by said heat exchanger;
an electric heater disposed in said heat exchanger in heat exchange relationship with said heat storage means;
a first conduit connecting the inlet port of said autoclave with the outlet port of said heat exchanger;
a second conduit connecting the outlet port of said autoclave with the inlet port of said heat exchanger;
a blower for circulating gas through said autoclave and heat exchanger;
gas storage tank having an outlet a third conduit connecting the outlet of said storage tank with said heat exchanger;
gas control means in said third conduit for controlling gas flow from said gas storage tank to said heat exchanger;
vent valve means connected with said autoclave for releasing pressure therein; and
electrical control means for controlling the current to said electric heater whereby said heater may be actuated to heat said heat storage means, said gas control means actuated to pressurize said autoclave and heat exchanger, and said blower actuated to circulate said gas through said heat exchanger and in heat exchange relationship with said heat storage means to heat said gas to an elevated temperature.

2. An autoclave system as set forth in claim 1 wherein:
said autoclave includes a return passage for receipt of gas passed over said product to return said gas to said autoclave inlet port for mixing with incoming gas to cool said incoming gas to avoid overheating of said product.

3. An autoclave system as set forth in claim 1 that includes:
valve means in said first conduit for controlling gas flow therethrough.

4. An autoclave system as set forth in claim 1 that includes:
valve means in said second conduit for controlling gas flow therethrough.